(12) United States Patent
Zhang et al.

(10) Patent No.: US 10,805,895 B2
(45) Date of Patent: Oct. 13, 2020

(54) METHODS, DEVICES AND SYSTEMS FOR INITIAL GRANT-FREE TRANSMISSION DETERMINATION

(71) Applicant: Huawei Technologies Co., Ltd., Shenzhen (CN)

(72) Inventors: Liqing Zhang, Ottawa (CA); Yiqun Wu, Shanghai (CN); Yan Chen, Shenzhen (CN); Yi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/196,342

(22) Filed: Nov. 20, 2018

(65) Prior Publication Data

US 2019/0174446 A1 Jun. 6, 2019

Related U.S. Application Data

(60) Provisional application No. 62/593,827, filed on Dec. 1, 2017.

(51) Int. Cl.
*H04W 56/00* (2009.01)
*H04L 1/08* (2006.01)
*H04L 1/18* (2006.01)
*H04W 88/06* (2009.01)
*H04W 92/04* (2009.01)

(52) U.S. Cl.
CPC .......... *H04W 56/0045* (2013.01); *H04L 1/08* (2013.01); *H04L 1/1819* (2013.01); *H04W 88/06* (2013.01); *H04W 92/045* (2013.01); *H04L 1/189* (2013.01)

(58) Field of Classification Search
None
See application file for complete search history.

(56) References Cited

U.S. PATENT DOCUMENTS

2010/0080152 A1* 4/2010 Lindh ................... H04L 1/1812
370/280
2018/0176945 A1* 6/2018 Cao ........................ H04L 5/0055
(Continued)

FOREIGN PATENT DOCUMENTS

WO 2017167198 A1 10/2017

OTHER PUBLICATIONS

3rd Generation Partnership Project; Technical Specification Group Radio Access Network; NR; Physical layer procedures for data (Release 15), 3GPP TS 38.214, V1.2.0, Nov. 2017, 55 Pages.
(Continued)

*Primary Examiner* — Otis L Thompson, Jr.
(74) *Attorney, Agent, or Firm* — Slater Matsil, LLP

(57) ABSTRACT

In accordance to embodiments, methods, devices, and systems for determining initial transmissions in grant-free transmissions are disclosed. A UE receives a resource configuration for grant-free (GF) transmissions. The resource configuration comprises a periodicity parameter (P), a repetition number (K), and a sequence of redundancy version (RV) numbers corresponding to one or more RV types. The periodicity parameter defines a period having K transmission occasions (TOs), and each of the K TOs is associated with one RV number in the sequence of RV numbers. The UE performs an initial GF transmission of data in a TO of the K TOs in the period defined by the periodicity parameter. The TO is associated with an RV number corresponding to RV0.

22 Claims, 13 Drawing Sheets

(56) References Cited

U.S. PATENT DOCUMENTS

| | | | |
|---|---|---|---|
| 2018/0206246 A1* | 7/2018 | Zhang | H04W 74/006 |
| 2018/0219649 A1* | 8/2018 | Ying | H04L 1/1816 |
| 2018/0324889 A1* | 11/2018 | Babaei | H04W 72/042 |
| 2018/0375616 A1* | 12/2018 | Beale | H04L 1/1816 |
| 2019/0075589 A1* | 3/2019 | Jeon | H04L 1/08 |
| 2019/0150164 A1* | 5/2019 | Nam | H04L 1/1819 370/329 |
| 2019/0173620 A1* | 6/2019 | Oh | H04L 1/1861 |
| 2019/0190681 A1* | 6/2019 | Li | H04W 76/38 |
| 2019/0230689 A1* | 7/2019 | Cao | H04L 5/0007 |
| 2019/0254088 A1* | 8/2019 | Park | H04L 1/1819 |
| 2019/0393988 A1* | 12/2019 | Bae | H04L 1/1812 |

OTHER PUBLICATIONS

3rd Generation Partnership Project; Technical Specification Group Radio Access Network; NR; Radio Resource Control (RRC); Protocol specification (Release 15), 3GPP TS 38.331, V0.1.0, Oct. 2017, 161 Pages.

Huawei et al., "On the determination of UE ID and HARQ process for UL grant-free transmission," 3GPP TSG RAN WG1, Meeting #90, R1-1712215, Aug. 2017, 6 Pages.

Huawei et al., "UL data transmission procedure without UL grant", 3GPP TSG RAN WG1, Meeting #91, R1-1719411, Nov. 27-Dec. 1, 2017, 14 Pages.

Nokia et al., "On remaining issues for UL transmission without grant", 3GPP TSG RAN WG1, Meeting 91, R1-1720481, Nov. 27-Dec. 1, 2017, 4 Pages.

NTT Docomo, "Proposal for 7.3.3.4", 3GPP TSG RAN WG1 #91, R1-1721718, Nov. 27-Dec. 1, 2017, 5 Pages.

Mediatek Inc., "On UL data transmission without grant design and configuration", 3GPP TSG RAN WG1, Meeting 90bis, R1-1718345, Oct. 2017, 7 Pages, Prague, Czech Republic.

Zte, et aL., "Remaining details of UL transmission without grant", 3GPP TSG RAN WG1, Meeting 90ibs, R1-1717442, Oct. 2017, 8 Pages, Prague, Czech Republic.

* cited by examiner

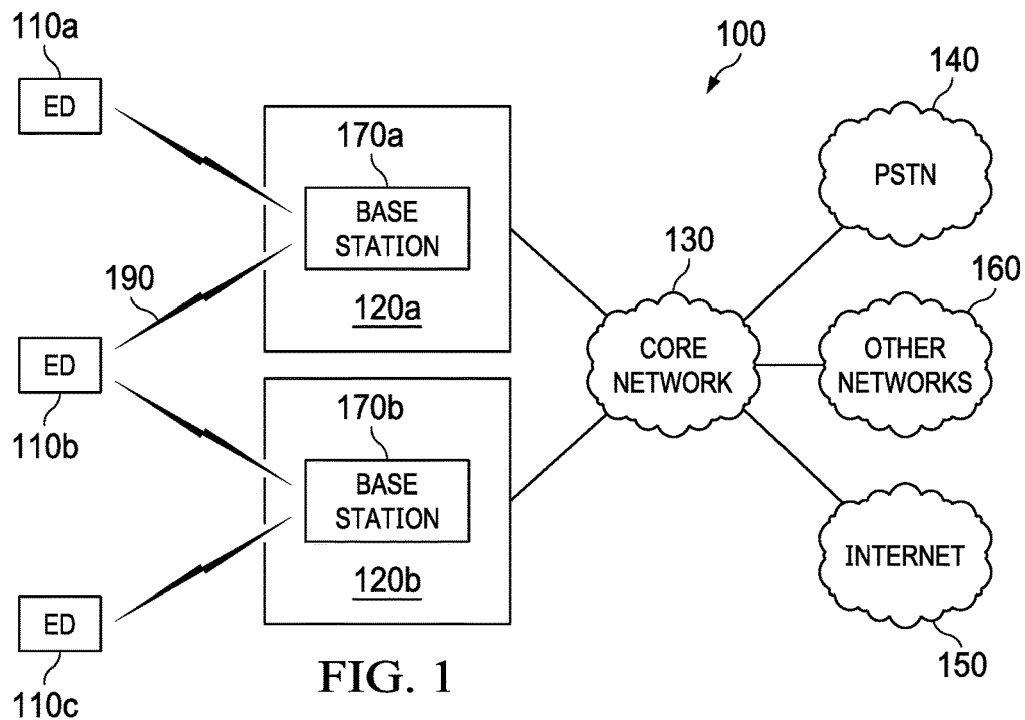
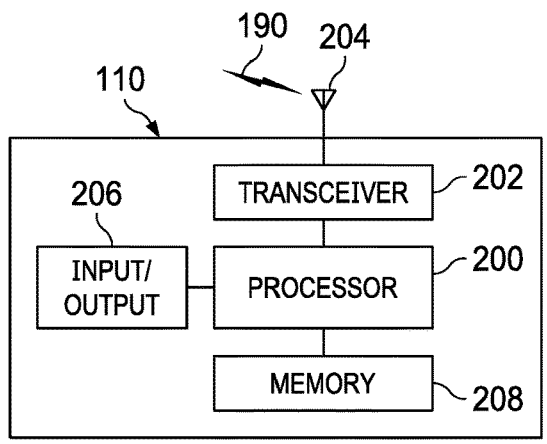
FIG. 2A
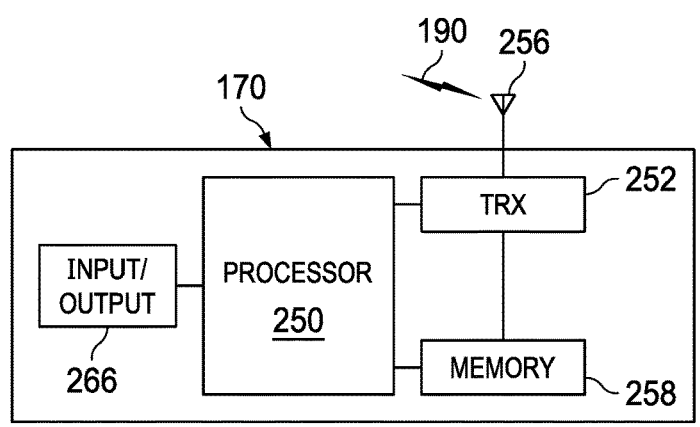
FIG. 2B

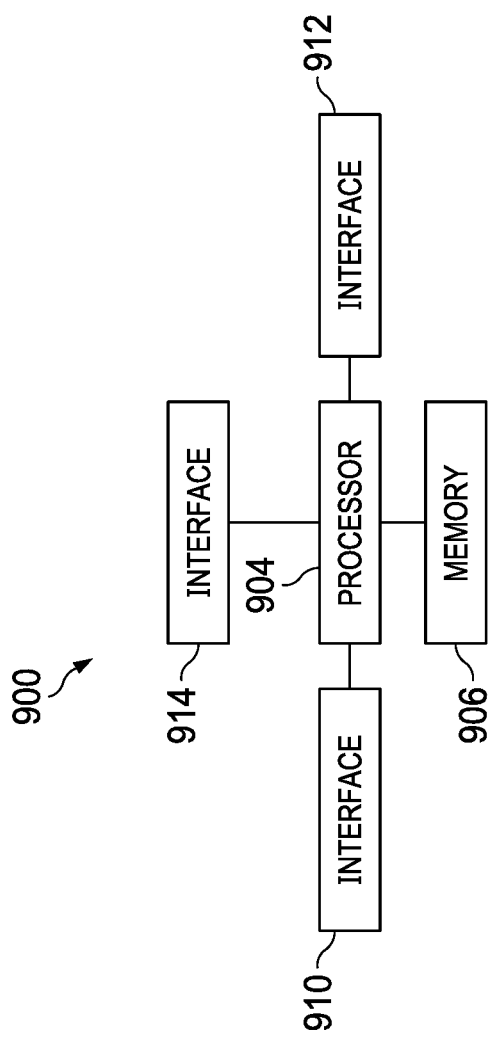
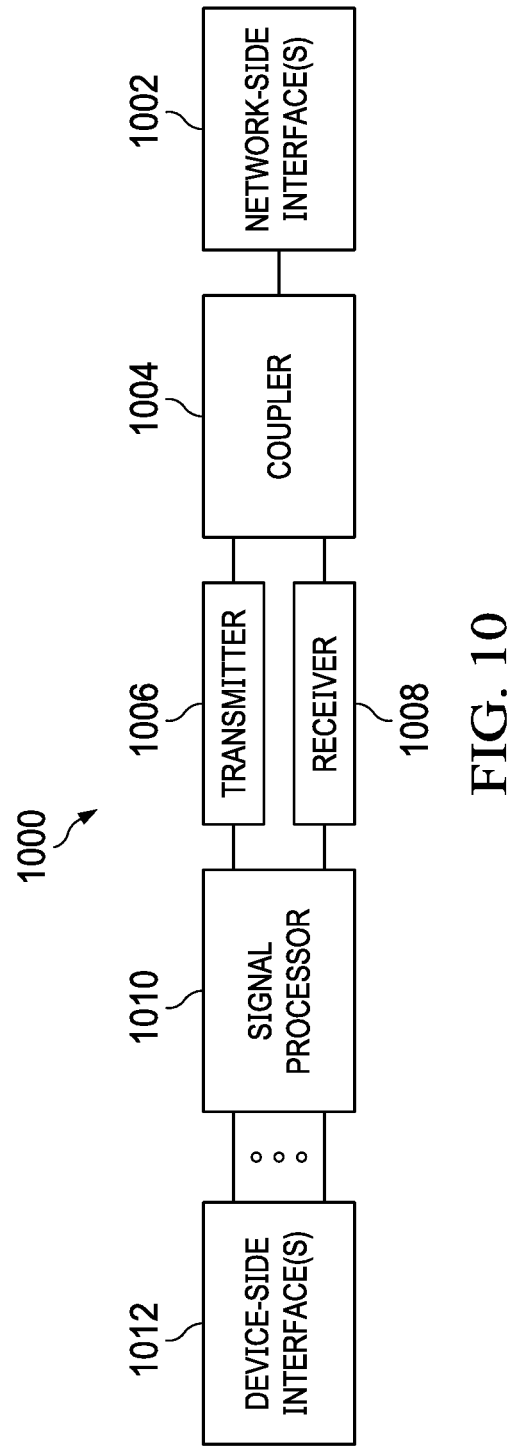

METHODS, DEVICES AND SYSTEMS FOR INITIAL GRANT-FREE TRANSMISSION DETERMINATION

CROSS-REFERENCE TO RELATED AFFIXATIONS

This application claims the benefit of U.S. Provisional Application No. 62/593,827, filed on Dec. 1, 2017, and entitled "Methods, Devices and Systems for Initial Grant-Free Transmission Determination," which application is hereby incorporated herein by reference in its entirety.

TECHNICAL FIELD

The present disclosure relates to relates to wireless communications, and, in particular embodiments, to methods, devices, and systems for determining initial transmissions in grant-free transmissions.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency division multiple access (OFDMA) frame.

The base station is aware of the identity of the UE sending the uplink transmission using the granted uplink resources, because the base station specifically granted those uplink resources to that UE. However, there may be schemes in which the base station does not know which UE, if any, or when the UE is going to send an uplink transmission using certain uplink resources. An example of such scheme is a grant-free uplink transmission scheme in which UEs may send uplink transmissions using certain uplink resources shared by the UEs, without specifically requesting use of the resources and without being dynamically granted the resources by the base station. The base station will therefore not know which UE, if any, and when the UE would send a grant-free uplink transmission using the preconfigured resources. Multiple terminologies can be used to mean the same scheme as grant-free transmissions, such as grant-less, grant-free random access, configured grant transmission, pre-configured grant transmission, (pre-)configured autonomous, configured grant Type 1, configured grant Type 2, and transmission without dynamic scheduling.

SUMMARY

Methods and systems for a user equipment (UE) to determine the initial transmission timing and initial transmission redundancy version (RV) in a grant-free transmission in a wireless system are disclosed.

In a first aspect of this disclosure, a method of initial transmission in a grant-free transmission in a wireless system is provided. The method comprises receiving, by a user equipment, a redundancy version (RV) sequence and sending, by the user equipment, a first version of to-be-transmitted data in a transmission occasion according to the RV sequence, where the initial transmission of the first version of to-be-transmitted data is performed using a RV scheme (e.g., RV0) for the data encoding in ways of being self-decodable or decodable independently. With this method, the latency can be reduced as compared to the conventional systems.

In a first implementation form of the method of the first aspect, the first version of data is RV0 or RV3 or any self-decodable redundancy version or any redundancy version of the to-be-transmitted data.

In a second implementation form of the method of the first aspect, the transmission occasion for the grant-free transmission is the next available transmission occasion.

In a third implementation form of the method of the first aspect, the next available transmission occasion for the grant-free transmission is the occasion allocated to transmit RV0 or RV3 or any self-decodable redundancy version or any redundancy version of the to-be-transmitted data according to the RV sequence.

In a fourth implementation form of the method of the first aspect, the next available transmission occasion for the grant-free transmission is the first transmission occasion of a repletion bundle if one element of the RV sequence is not self-decodable.

In a fifth implementation form of the method of the first aspect, the next available transmission occasion is any transmission occasion of a repletion bundle if all elements of the RV sequence is self-decodable.

In a second aspect of this disclosure, a user equipment to implement the method to make an initial transmission in a grant-free transmission in a wireless system in the first aspect is provided.

In accordance to embodiments, methods, devices, and systems for determining initial transmissions in grant-free transmissions are provided. A UE receives a resource configuration for grant-free (GF) transmissions. The resource configuration comprises a periodicity parameter (P), a repetition number (K), and a sequence of redundancy version (RV) numbers corresponding to one or more RV types. The periodicity parameter defines a period having K transmission occasions (TOs), and each of the K TOs is associated with one RV number in the sequence of RV numbers. The UE performs an initial GF transmission of data in a TO of the K TOs in the period defined by the periodicity parameter. The TO is associated with an RV number corresponding to RV0.

In accordance to embodiments, a UE receives a resource configuration for grant-free (GF) transmissions. The resource configuration comprises a periodicity parameter (P), a repetition number (K), and a sequence of redundancy version (RV) numbers comprising {0, 2, 3, 1}. 0 in the sequence corresponding to RV0, 1 in the sequence corresponding to RV1, 2 in the sequence corresponding to RV2, and 3 in the sequence corresponding to RV3. The periodicity parameter defines a period having K transmission occasions (TOs), and each of the K TOs is associated with one RV number in the sequence of RV numbers.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 shows a communication system, according to embodiments;

FIG. 2A shows an exemplary wireless communication device;

FIG. 2B shows an exemplary base station;

FIGS. 4A-4I show exemplary embodiments where the starting point is based on a RV on a TO;

FIG. 9 illustrates a block diagram of an embodimentprocessing system; and

FIG. 10 illustrates a block diagram of an embodiment transceiver.

DETAILED DESCRIPTION OF ILLUSTRATIVE EMBODIMENTS

Figure 3A:
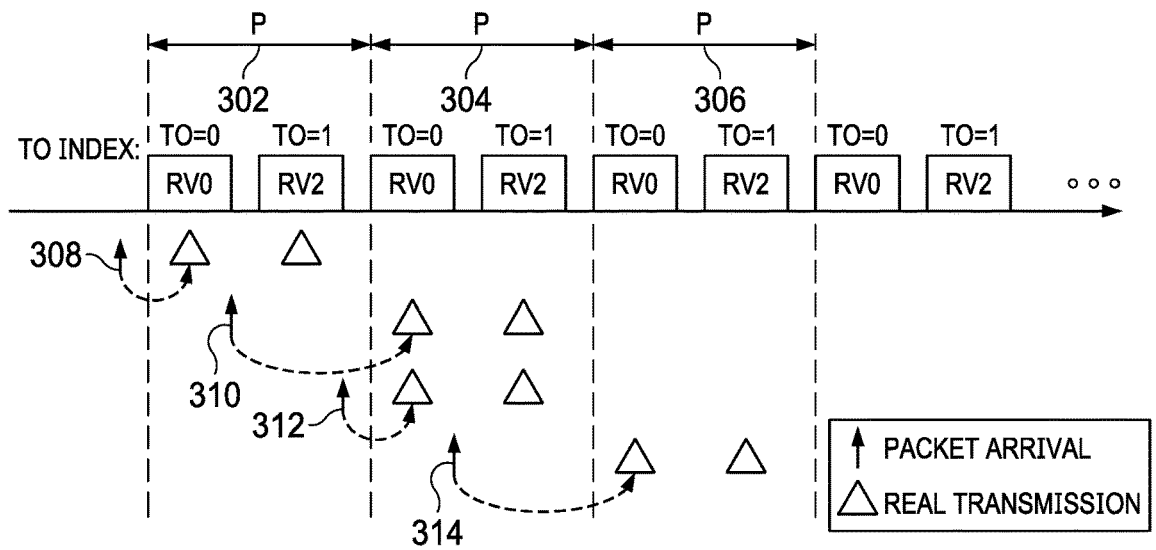
FIGS. 3A-3I show exemplary embodiments where the starting point is based on a RV sequence.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (Er)) 110a-110c, radio access networks (RANs) 120a-120b, a core network 130, a public switched telephonic network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100, For example, the EDs 110a-110c are configured to transmit and/or receive via wireless or wired communication channels. Each ED 110a-110c represents any suitable end user device and may include such devices (or may he referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, or a transmit-receive point (TRP), The EDs 110a-110c are configured to interface and communicate with the internet 150 and may access the core network 130, the PSTN 40, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

FIGS. 2A and 2B illustrate example devices that may implement the methods and teachings according to this disclosure. In particular, FIG. 2A illustrates an example ED no, and FIG. 2B illustrates an example base station 170. These components could be used in the system 100 or in any other suitable system.

As shown in FIG. 2A, the ED no includes at least one processor 200. The processor 200 implements various processing operations of the ED 110. For example, the processor 200 could perform signal coding, data processing, power control, input/output processing, or any other functionality enabling the ED 110 to operate in the system 100. The processor 200 also supports the methods and teachings described in more detail above. Each processor 200 includes any suitable processing or computing device configured to perform one or more operations. Each processor 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED no includes at least one memory 208. The memory 208 stores instructions and data used, generated, or collected by the ED 110. For example, the memory 208 could store software or firmware instructions executed by the processor(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2E, the base station 170 includes at least one processor 250, at least one transceiver 252, which includes functionality for a transmitter and a receiver, one or more antennas 256, at least one memory 258, and one or more input/output devices or interfaces 266. A scheduler 253, which would be understood by one skilled in the art, is coupled to the processor 250. The scheduler 253 could be included within or operated separately from the base station 170. The processor 250 implements various processing operations of the base station 170, such as signal coding, data processing, power control, input/output processing, or any other functionality. The processor 250 can also support the methods and teachings described in more detail above. Each processor 250 includes any suitable processing or computing device configured to perform one or more operations. Each processor 250 could, for example, include a microprocessor, microcontroller, digital signal processor, field programmable gate array, or application specific integrated circuit.

Each transceiver 252 includes any suitable structure for generating signals for wireless or wired transmission to one or more EDs or other devices. Each transceiver 252 further includes any suitable structure for processing signals received wirelessly or by wire from one or more EDs or other devices. Although shown combined as a transceiver 252, a transmitter and a receivercould be separate components. Each antenna 256 includes any suitable structure for transmitting and/or receiving wireless or wired signals. While a common antenna 256 is shown here as being coupled to the transceiver 252, one or more antennas 256 could be coupled to the transceiver(s) 252, allowing separate antennas 256 to be coupled to the transmitter and the receiver if equipped as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

In both EDs like FIG. 2A or base stations like FIG.2B, memory can be integrated to processor when the processor are implemented by hardware, such as using integrated circuits or logic circuits.

In some embodiments, a user equipment (UE) may receive a Radio Resource Control (RRC) signal. The RRC signal may specify at least grant-free resources comprising periodicity parameter (P), repetitions (K, including initial transmission) or retransmissions, and a redundant version (RV) sequence for repetitions (K) or retransmissions. In other embodiments, such a RV sequence can be configured by a downlink control information (DCI) signal. The repetitions within a period can be applied for the transmission of the same transmission block (TB).

The resource configuration can be done by considering P and K independently. One way of the resource configuration for grant-free transmissions is that P determines the initial transmissions occasions while the K−1 repetitions can follow the initial transmissions immediately or with certain time distance(s) between the repetitions. The configured RV sequence can be associated with the K repetition transmission occasions. For example, RV0 is associated with the initial transmission occasion, RV1 is associated with the second transmission in the repetitions, and so on. Basically, an RV sequence will be associated sequentially with the repetitions (and repeated itself if K is larger than the RV sequence length).

In some embodiments, one scheme of configuring grant-free resources is to further consider the P value associated with the UE specific repetition parameter value (K). For example, P can be determined by its periodicity granularity with a constraint of P>K, and K−1 repetitions can follow the initial transmission immediately using available time frequency resources. Some design problems relate to what behavior a UE is supposed to perform if the UE's traffic arrival misses one initial transmission occasion, whether the UE may wait for the next initial transmission occasion, or whether the UE may transmit right way in any of the (K−1) repetition transmission occasions. Another technical design problem relates to how the base station will decode data with a RV that is not self-decodable or hard to be decoded. To solve the above technical design problems, embodiments of this disclosure provide techniques for determining initial transmissions in grant-free transmissions. In some embodiments, a UE receives a resource configuration for grant-free (GF) transmissions. The resource configuration comprises a periodicity parameter (P), a repetition number (K), and a sequence of redundancy version (RV) numbers corresponding to one or more RV types. The periodicity parameter defines a period having K transmission occasions (TOs), and each of the K TOs is associated with one RV number in the sequence of RV numbers. The UE performs an initial GF transmission of data in a TO of the K TOs in the period defined by the periodicity parameter. The TO is associated with an RV number corresponding to RV0. In other embodiments, a UE receives a resource configuration for grant-free (GF) transmissions. The resource configuration comprises a periodicity parameter (P), a repetition number (K), and a sequence of redundancy version (RV) numbers comprising {0, 2, 3, 1}. 0 in the sequence corresponding to RV0, 1 in the sequence corresponding to RV1, 2 in the sequence corresponding to RV2, and 3 in the sequence corresponding to RV3. The periodicity parameter defines a period having K transmission occasions (TOs), and each of the K TOs is associated with one RV number in the sequence of RV numbers. By allowing the initial transmission of the first version of to-be-transmitted data to be performed using a RV scheme (e.g., RV0) for the data encoding in ways of being self-decodable or decodable independently, the disclosed embodiments help reduce the latency as compared to the conventional systems In so doing, the disclosed techniques improve the performance of grant-free transmissions and more efficiently utilize the resources for the grant-free transmissions.

The UE may perform the grant-free (GF) uplink (UL) transmission without waiting for a downlink control information (DCI) signal. However, the traffic arrival of a UE can be any time, so it is possible that UE can have a packet arrival that will miss one initial transmission occasion (pre-)configured by P. If the UE transmit in the subsequent repetition occasions with RVs that are associated with the occasions, for some RV sequence, part or all of these RVs may not be self-decodable without the RV0 (the RV0 is usually self-decodable). With a different redundancy version (RV) number, the rate matching output bit sequence of channel coding is different. Not all RVs are self-decodable (i.e., it is not able to recover the information bits with the output bit sequence of certain RVs). For example, the RV number can be 0, 1, 2, or 3. With some channel code design, RV0 is self-decodable. With other channel code design, RV0 and RV3 are self-decodable. As a result, if the UE traffic arrival misses one initial transmission occasion but the RV sequence is all self-decodable (e.g., an RV sequence of {0,0,0,0}), the UE can transmit the packet right way in the earliest available repetition transmission occasion. Otherwise, the UE has to wait for the next available initial transmission occasion. Whether or not to perform immediate transmission or wait for the next initial transmission occasion will depend on which RV sequence is configured for the UE.

In some embodiments, there are three RV sequence options to be used for configuration, the three options include Sequence 1 ({0, 2, 3, 1}), Sequence 2 ({0, 3, 0, 3}), and sequence 3 ({, 0, 0, 0}). If the first option, RV Sequence 1, is configured, then the UE will wait for the next initial transmission occasion for its packet transmission if the UE misses one initial transmission occasion; otherwise, all the RVs are self-decodable, and the UE will start data transmission in any repetition transmission occasion.

In some embodiments, there are three RV sequence options to be used for configuration: Sequence 1: {0, 2, 3, 1}, Sequence 2: {0, 3, 0, 3}, Sequence 3: {0, 0, 0, 0}. If the first RV Sequence 1 or second RV Sequence 2 is configured, then if missing one initial transmission occasion, the UE will wait for the next initial transmission occasion for its packet transmission; otherwise, all the RVs are self-decodable, and the UE will start data transmission in any repetition transmission occasion.

In some embodiments, the UE can start data transmission in any repetition transmission occasion without coupling with the configured RV sequence. In this case, the base station will store all the received signals with possible HAN soft-combing because the RVs are known by pre-associations.

In other embodiments, the UE can start data transmission always from an initial transmission occasion. If an initial transmission occasion is missed upon the traffic arrival, the UE will wait for next initial transmission occasion.

The grant-free (GF) uplink (UL) transmissions can be configured with the resources periodicity (P) and the repetitions (K). Within the period P, there can be K repetitions for the transmission of the same TB.

If K (i.e., repetitions) is used, the UE can be configured with one of the following three redundancy version (RV) sequences taking the example of supporting 4 different RV versions:

Sequence 1: {0, 2, 3, 1},
Sequence 2: {0, 3, 0, 3}, or
Sequence 3: {0, 0, 0, 0}.

Here 0, 1, 2, and 3 are the redundancy version numbers and generally can be written as RV0, RV1, RV2, and RV3, respectively.

With a different RV number, the rate matching output bit sequence is different. Not all RVs are self-decodable (i.e., it is not able to recover the information bits with the output bit sequence of a certain RV).

For a UL transmission without UL grant, the initial transmission of the K repetitions of a TB can start at any transmission occasion (TO) within a period P, and repetitions end at the last transmission occasion within the period P, except when the UE is configured with the RV sequence of {0, 2, 3, 1}.

When the UE is configured with the RV sequence of {0, 2, 3, 1}, the initial transmission of the K repetitions of a transmission block (TB) shall start at the first TO within a period. The RV sequence starts from the first transmission occasion of a repetition bundle, and UE determines the RV value for each repetition based on the transmission occasion where the repetition occurs. The RV used for the initial transmission is determined on following: the n-th transmission occasion within the period is the mod (n, 4)-th RV in the RV sequence.

For grant-free transmissions, it is possible that only certain redundancy versions are received. FIGS. 3A-3I show some exemplary embodiments, where the starting point, (i.e., the initial transmission timing (or TO)), is determined based on a RV sequence. A first RV of to-be-transmitted data is transmitted in the initial transmission TO.

In FIG. 3A, when K equals 2 and the RV sequence is configured to be {0, 2, 3, 1}, the starting point of the transmission can be only the first TO in the period. For example, the starting point of the transmission of the data for the packet arrival 310 can be TO=0 of the period 302, but not TO=1 of the period 302. The starting point of the transmission of the data for the packet arrival 312 can be TO=0 of the period 304, but not T0=1 of the period 302 or TO=1 of the period 304.

Figure 3B:
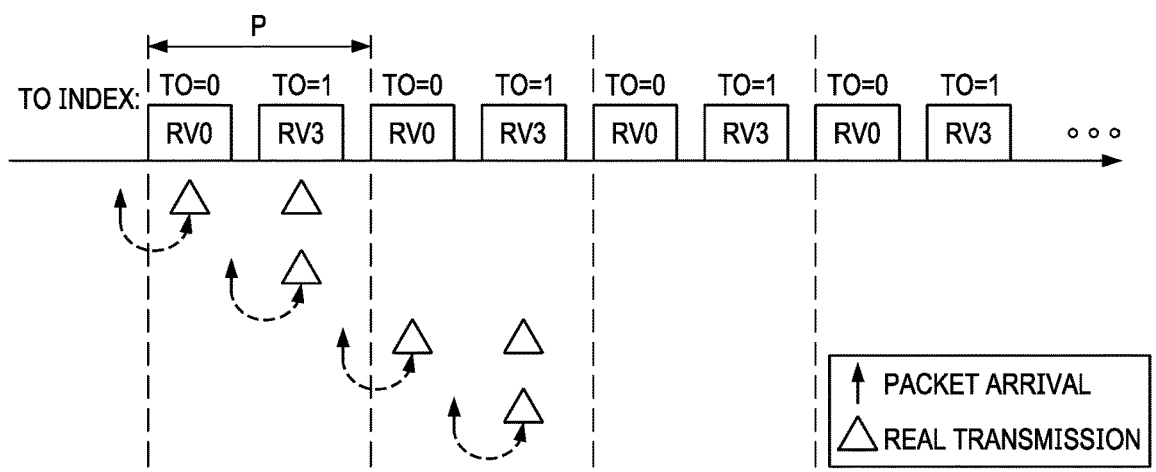

In FIG. 3B, when K equals 2 and the RV sequence is configured to be {0, 3, 0, 3}, the starting point of the transmission can be any TO in the period.

Figure 3C:
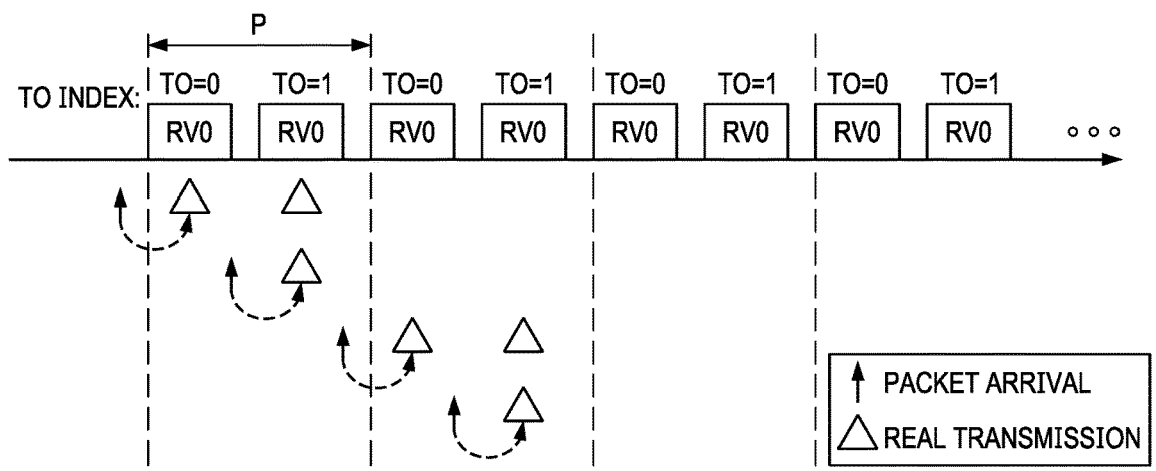

In FIG. 3C, when K equals 2 and the RV sequence is configured to be {0, 0, 0, 0}, the starting point of the transmission can be any TO in the period.

Figure 3D:
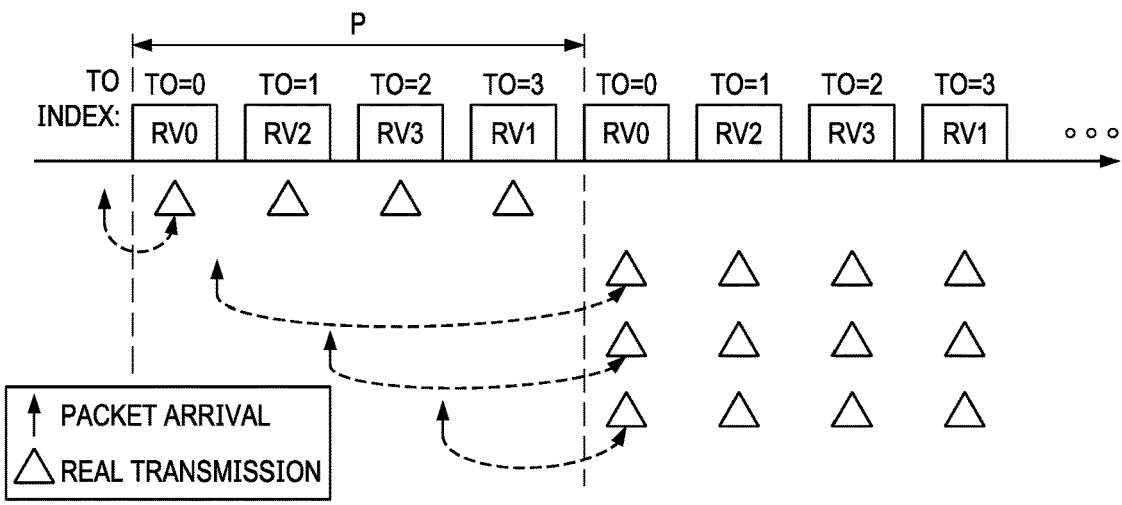

In FIG. 3D, when K equals 4 and the RV sequence is configured to be {0, 2, 3, 1}, the starting point of the transmission can only be the first TO in the period.

Figure 3E:
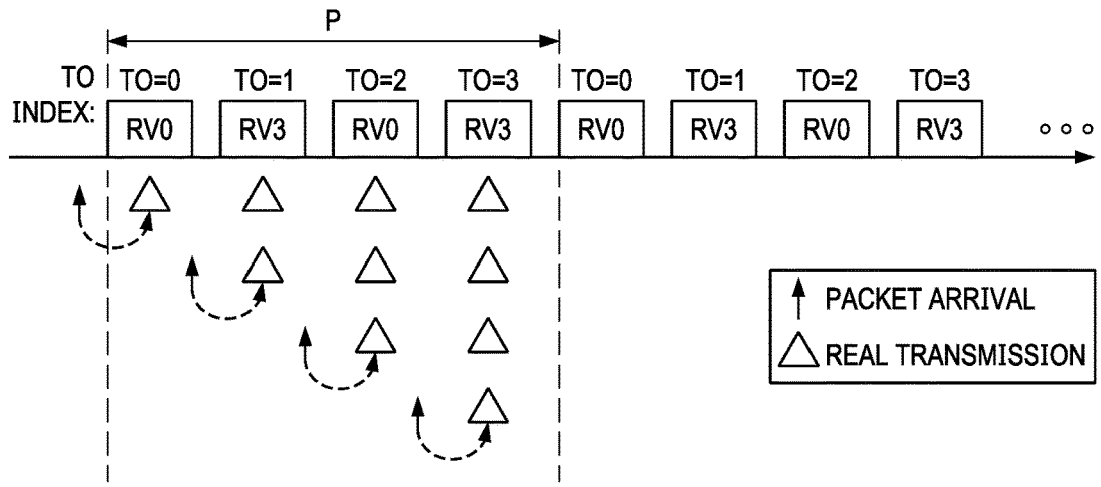

In FIG. 3E, when K equals 4 and the RV sequence is configured to be {0, 3, 0, 3}, the starting point of the transmission can be any TO in the period.

Figure 3F:
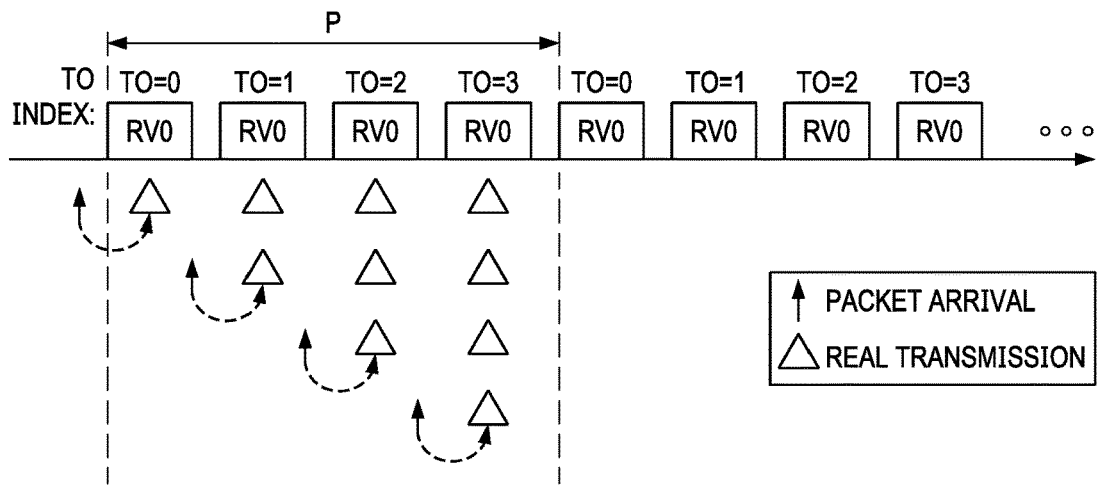

In FIG. 3F, when K equals 4 and the RV sequence is configured to be {0, 0, 0, 0}, the starting point of the transmission can be any TO in the period.

Figure 3G:
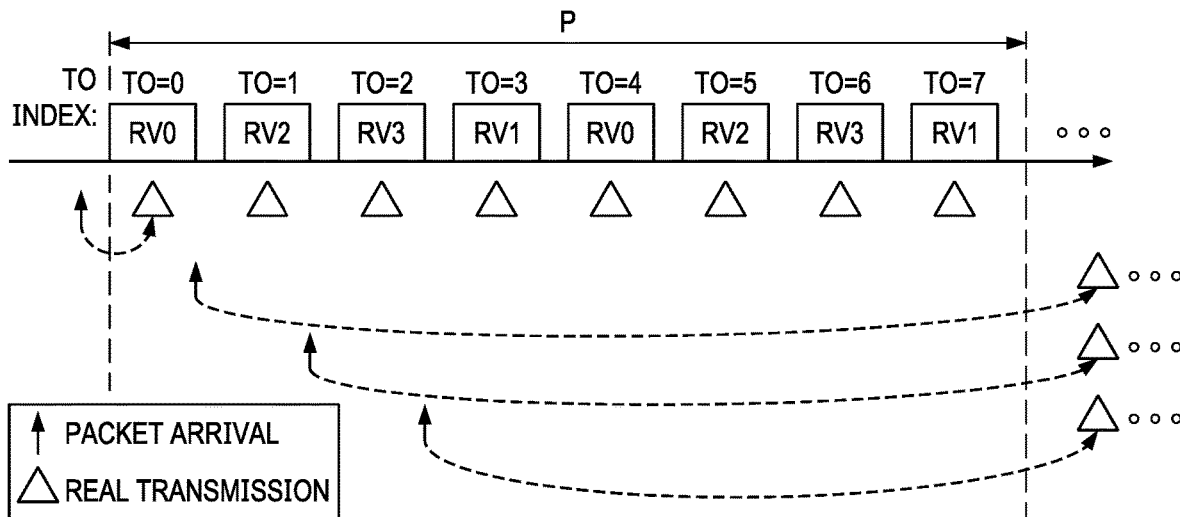

In FIG. 3G, when K equals 8 and the RV sequence is configured to be {0, 2, 3, 1}, the starting point of the transmission can be the first TO in the period.

Figure 3H:
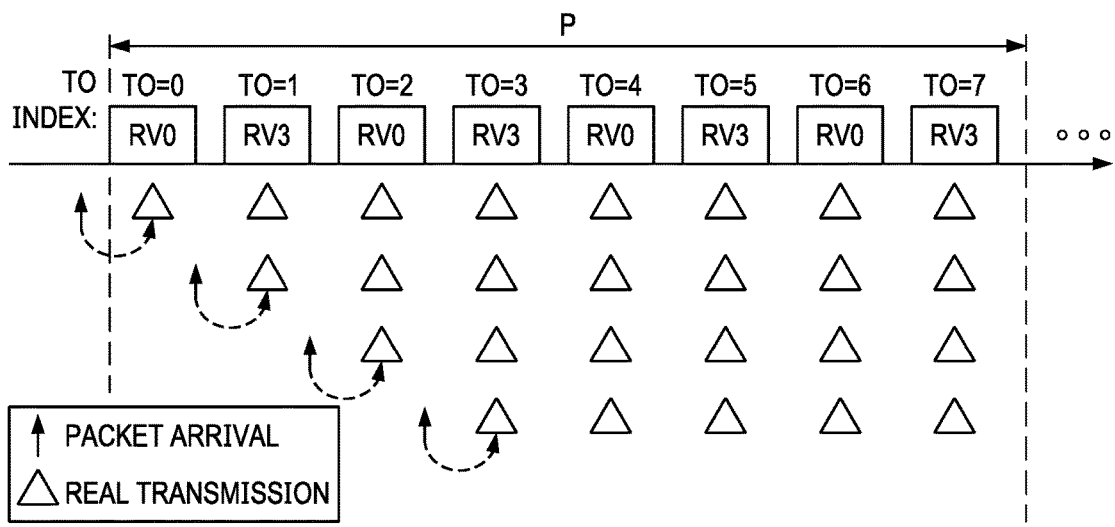

In FIG. 3H, when K equals 8 and the RV sequence is configured to be {0, 3, 0, 3}, the starting point of the transmission can be any TO in the period.

Figure 3I:
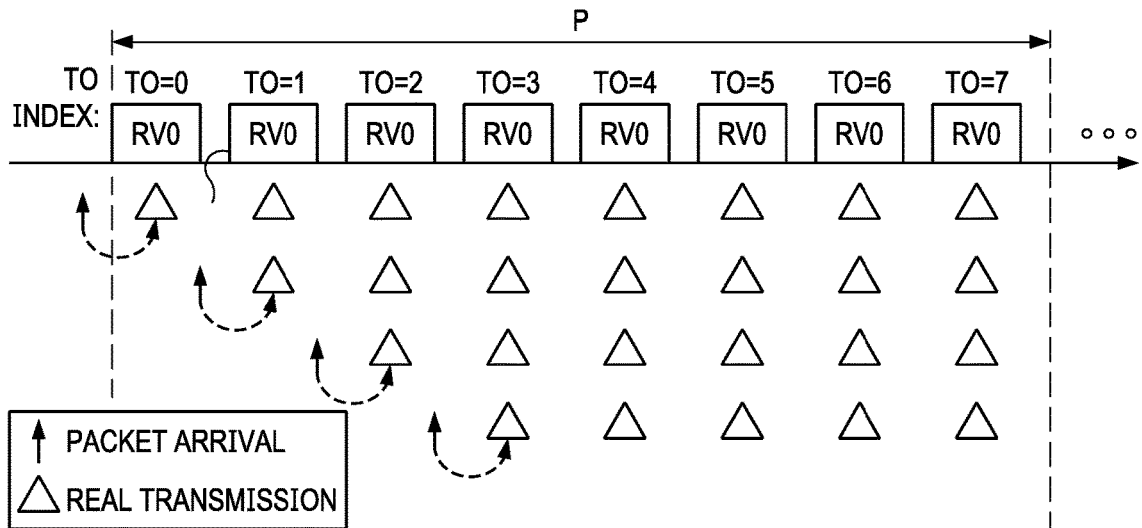

In FIG. 3I, when K equals 8 and the RV sequence is configured to be {0, 0, 0, 0}, the starting point of the transmission can be any TO in the period.

FIGS. 4A-4K show some exemplary embodiments, where the starting point (i.e., the initial transmission timing (or TO)), is determined based on a RV on a TO. A first RV of to-be-transmitted data is transmitted in the initial transmission TO.

Figure 4A:
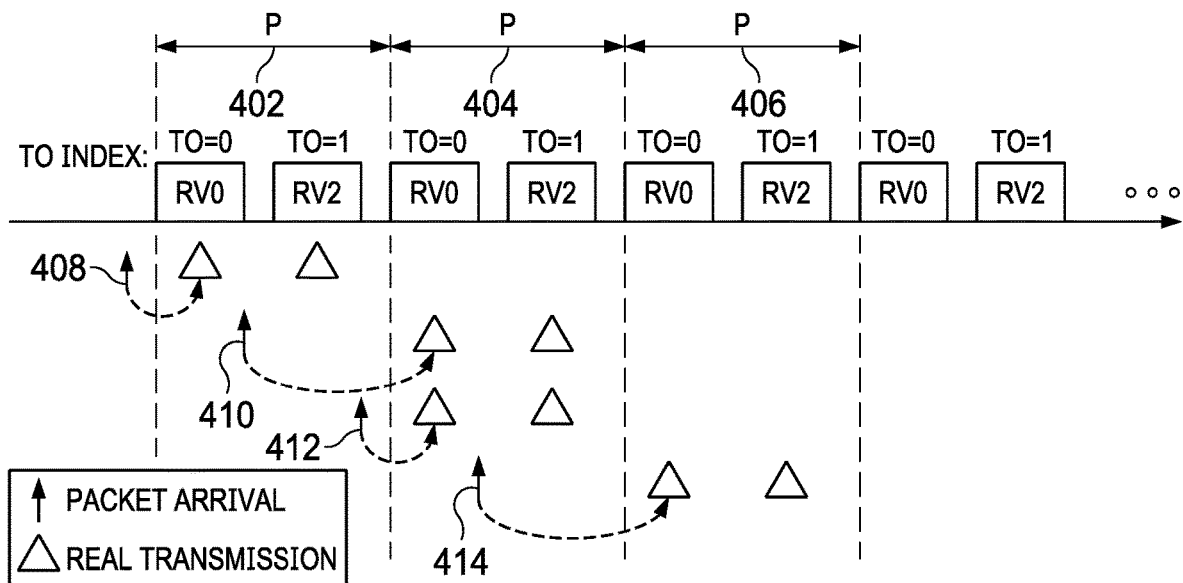

In FIG. 4A, when K equals 2 and the RV sequence is configured to be {0, 2, 3, 1}, the starting point of the transmission can only be the TOs with RV0, (i.e., the first TO in the period). For example, the starting point of the transmission of the data for the packet arrival 408 can be TO=0 of the period 402, but not TO=1 of the period 302. The starting point of the transmission of the data for the packet arrival 410 can be TO=0 of the period 404, but not TO=1 of the period 402 or TO=1 of the period 404.The starting point of the transmission of the data for the packet arrival 412 can be TO=0 of the period 404, but not TO=1 of the period 404.

Figure 4B:
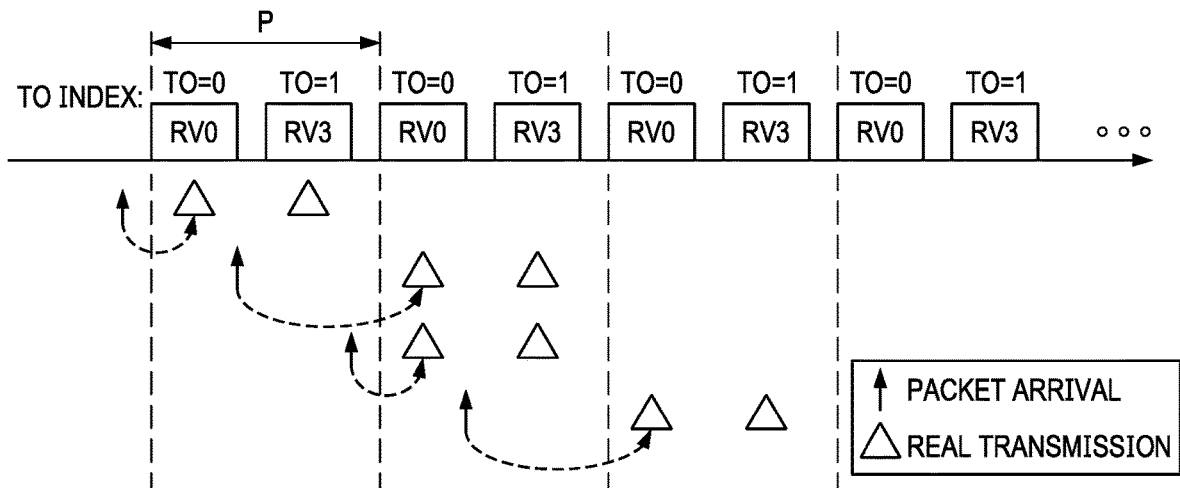

In FIG. 4B, when K equals 2 and the RV sequence is configured to be {0, 3, 0, 3}, the starting point of the transmission can only be the TOs with RV0 (i.e., the first TO in the period).

Figure 4C:
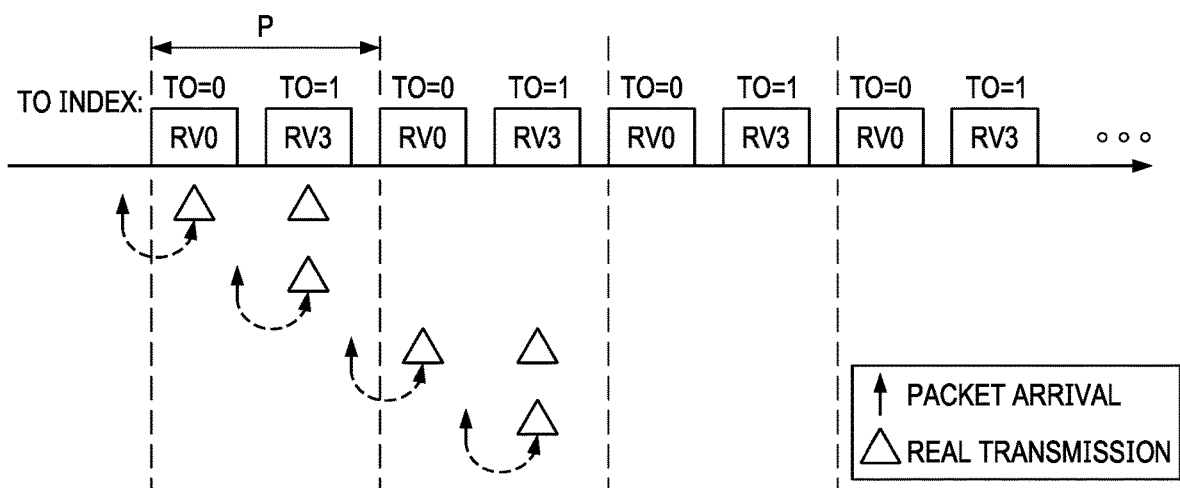

In FIG. 4C, when K equals 2 and the RV sequence is configured to be {0, 3, 0, 3}, the starting point of the transmission can only be the TOs with RV0 or RV3 (i.e., any TO in the period).

Figure 4D:
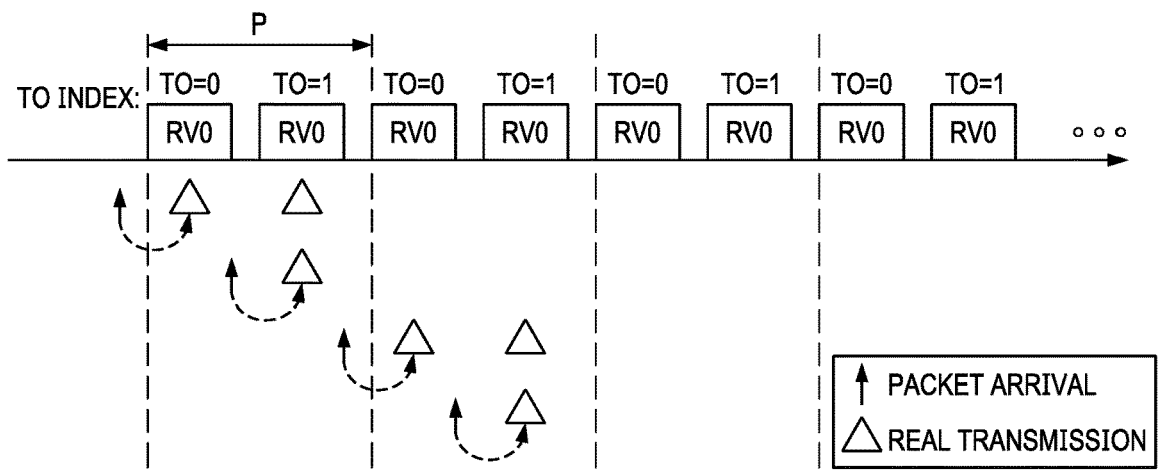

In FIG. 4D, when K equals 2 and the RV sequence is configured to be {0, 0, 0, 0}, the starting point of the transmission can only be the TOs with RV0 (i.e., any TO in the period).

Figure 4E:
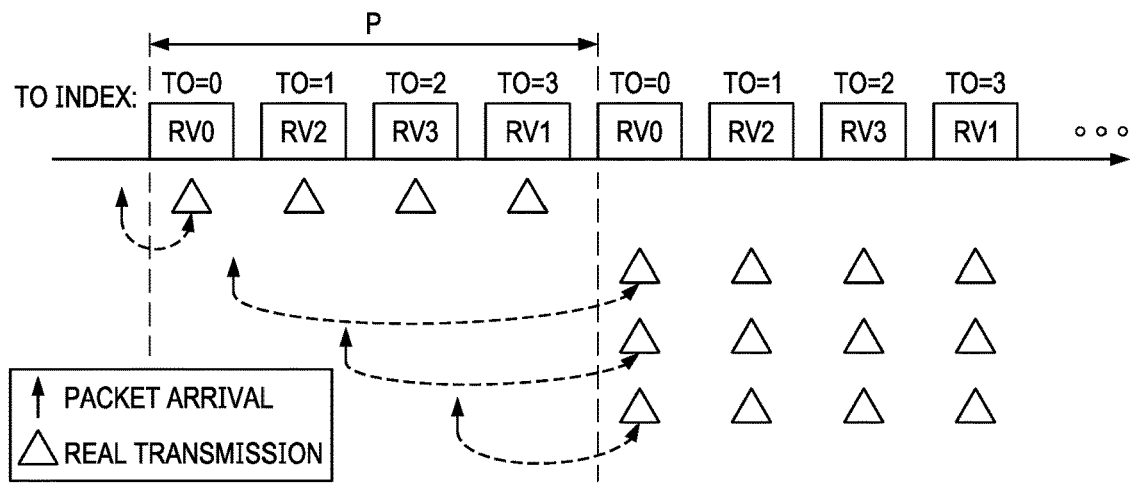

In FIG. 4E, when K equals 4 and the RV sequence is configured to be {0, 2, 3, 1}, the starting point of the transmission can only be the TOs with RV0 (i.e., the first TO in the period).

Figure 4F:
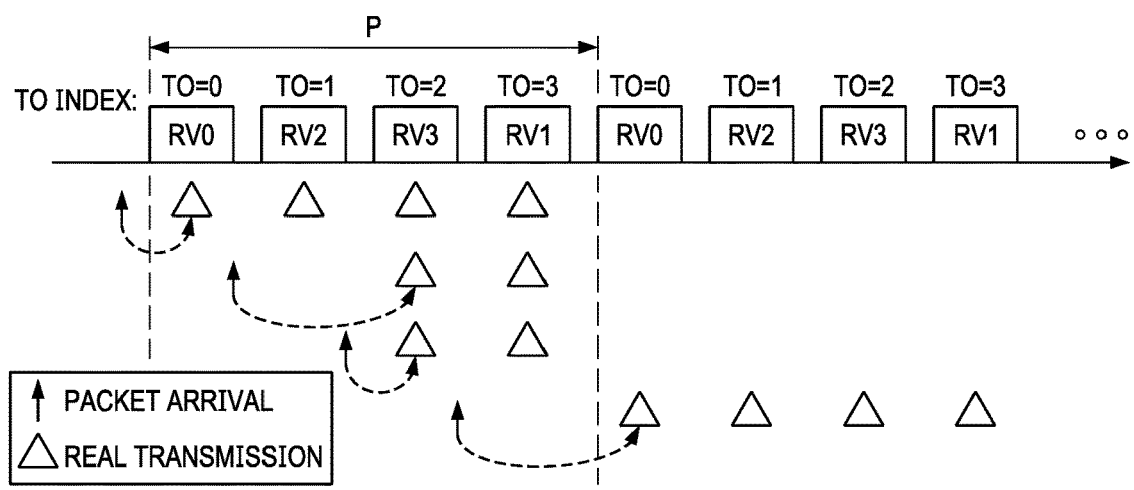

In FIG. 4F, when K equals 4 and the RV sequence is configured to be {0, 2, 3, 1}, the starting point of the transmission can only be the TOs with RV0 or RV3 (i.e., the first or the third TO in the period).

Figure 4G:
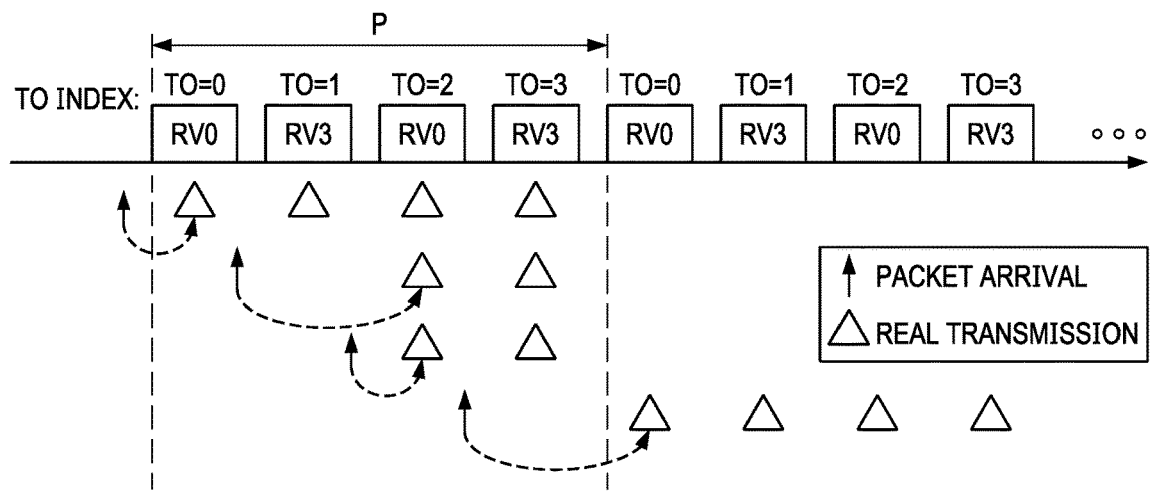

In FIG. 4G, when K equals 4 and the RV sequence is configured to be {0, 3, 0, 3}, the starting point of the transmission can only be the TOs with RV0 (i.e., the first or the third TO in the period).

Figure 4H:
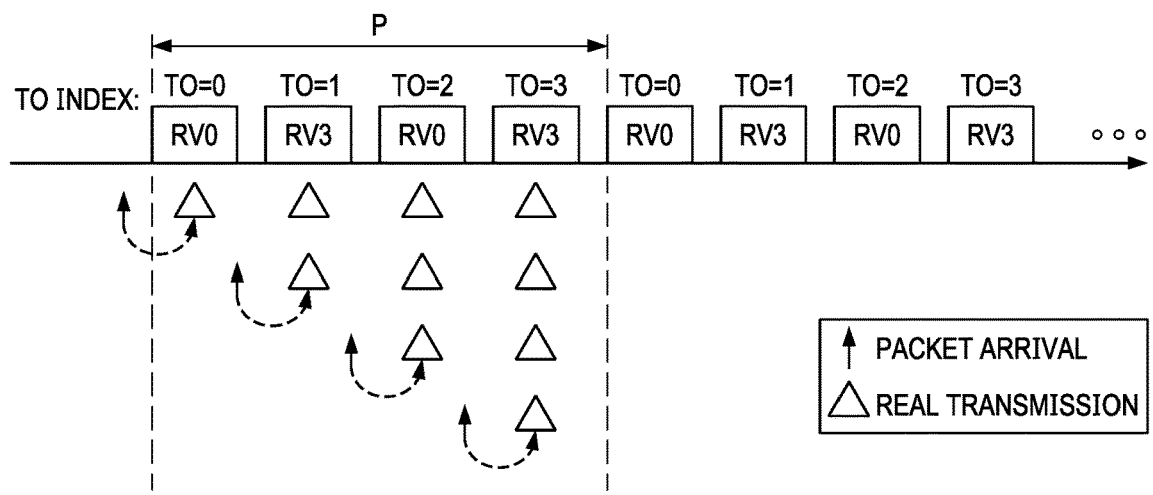

In FIG. 4H, when K equals 4 and the RV sequence is configured to be {0, 3, 0, 3}, the starting point of the transmission can only be the TOs with RV0 or RV3 (i.e., any TO in the period).

Figure 4I:
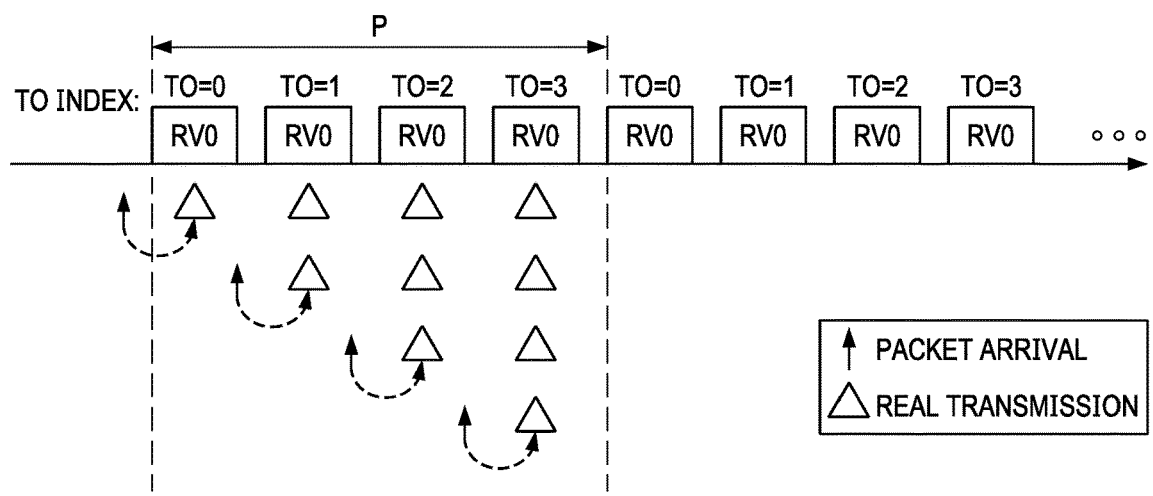

In FIG. 4I, when K equals 4 and the RV sequence is configured to be {0, 0, 0, 0}, the starting point of the transmission can only be the TOs with RV0 (i.e., any TO in the period).

Figure 4J:
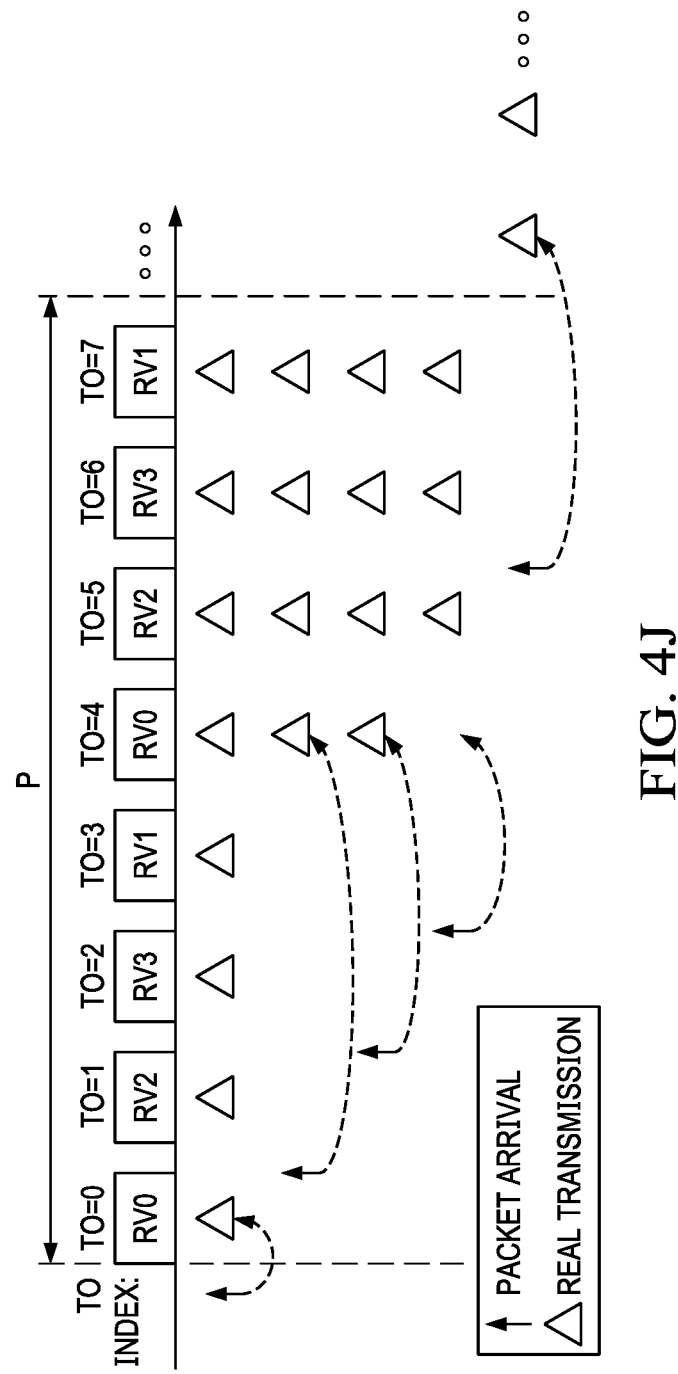

In FIG. 4J, when K equals 8 and the RV sequence is configured to be {0, 2, 3, 1}, the starting point of the transmission can only be the TOs with RV0 (i.e., the first or the fifth TO in the period).

Figure 4K:
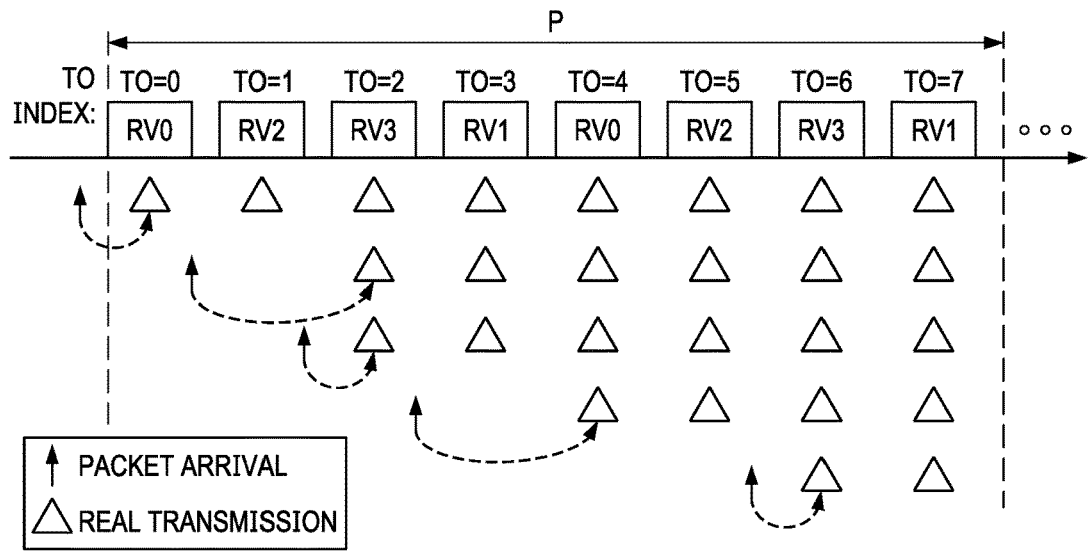

In FIG. 4K, when K equals 8 and the RV sequence is configured to be {0, 2, 3, 1}, the starting point of the transmission can only be the TOs with RV0 or RV3 (i.e., the first, the third, the fifth, or the seventh TO in the period).

Figure 5A:
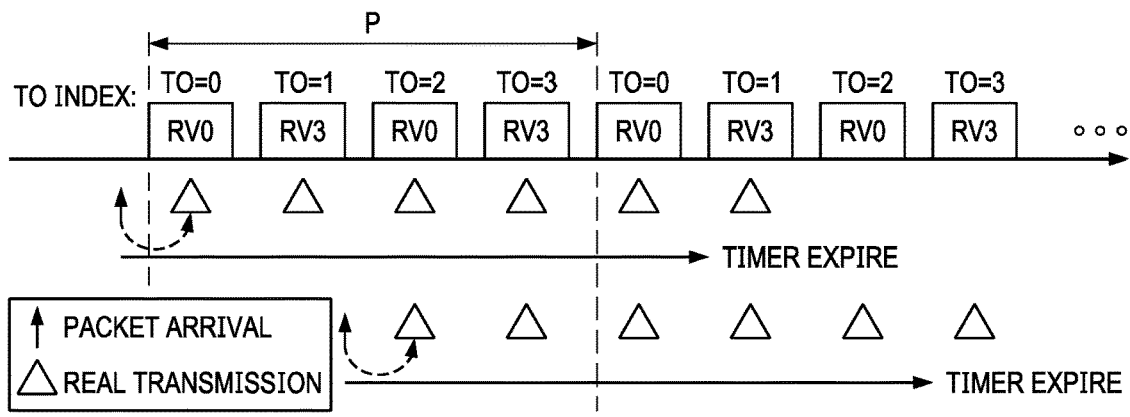
FIGS. 5A and 5B show exemplary embodiments where the starting point is determined based on a timer and a number of repetitions.
Figure 5B:
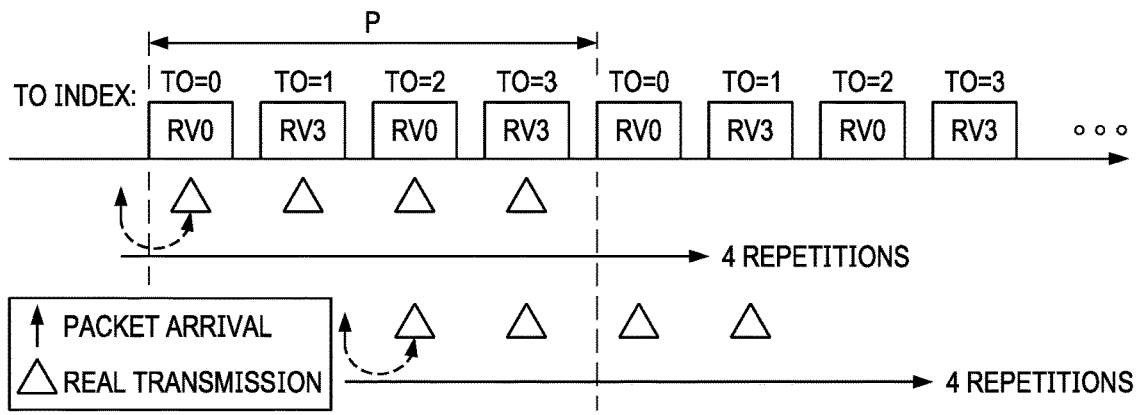

FIGS. 5A-5B shows some exemplary embodiments; where the starting point (i.e., the initial transmission timing (or TO)), is determined based on a timer and a number of repetitions. A first RV of to-be-transmitted data is transmitted in the initial transmission TO.

In FIG. 5A, for delay-sensitive traffic, there can be one or more delay timers. The delay timers will start when packets arrive. The timer values are related to the corresponding delay requirements of the packets. The transmission of each packet will end when the corresponding delay timer expires. The repetitions can also be terminated early if an ACK or a grant is received during the transmission.

In FIG. 5B, no matter when the UE starts the transmission, the number of repetitions is 4. The repetitions can also be terminated early if an ACK or a grant is received during the transmission.

Figure 6A:
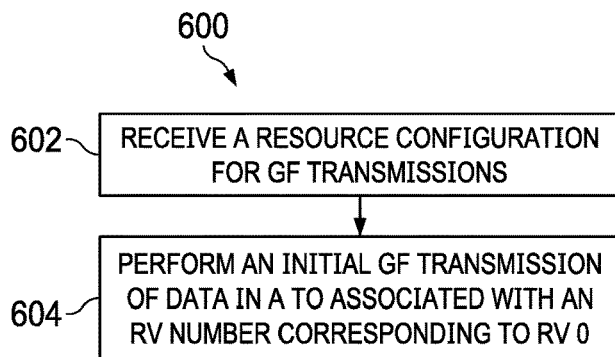
FIG. 6A shows a flowchart of a method for initial grant-free transmission determination, according to embodiments.

FIG. 6A illustrates a flowchart of a method 600 for initial grant-free transmission determination, according to some embodiments. The method 600 may be carried out or performed by a UE, such as the ED 110 in FIG. 1. The method 600 may also be carried out or performed by routines, subroutines, or modules of software executed by one or more processors of the UE. Coding of the software for carrying out or performing the method 600 is well within the scope of a person of ordinary skill in the art having regard to the present disclosure. The method may include additional or fewer operations than those shown and described and may be carried out or performed in a different order. Computer-readable code or instructions of the software executable by the one or more processor of the UE may be stored on a non-transitory computer-readable medium, such as for example, memory of the UE.

The method 600 begins at the operation 602, where the UE receives a resource configuration for grant-free (GF) transmissions. The resource configuration comprises a periodicity parameter (P), a repetition number (K), and a sequence of redundancy version (RV) numbers corresponding to one or more RV types. The periodicity parameter defines a period having K transmission occasions CFOs), and each of the K TOs is associated with one RV number in the sequence of RV numbers.

In some embodiments, the sequence of RV numbers comprising {0, 3, 0, 3}. Here, in the sequence corresponds to RV0, and 3 in the sequence corresponds to RV3. The K TOs are continuous or separated.

In sonic embodiments, a size of the sequence of RV numbers is 4. An n-th TO of the K TOs is associated with an (n mod 4)-th RV number in the sequence of RV numbers. Here, n is an integer greater than or equal to 0, and n is less than or equal to K−1.

At the operation 604, the UE performs an initial GF transmission of data in a TO of the K TOs in the period defined by the periodicity parameter. The TO is associated with an RV number corresponding to RV0.

In some embodiments, the UE performs one or more new initial GF transmissions of the data for at most K GF transmissions of the data. Or, the UE terminates the one or more new initial GF transmissions of the data at a last TO of the K TOs within the period defined by the periodicity parameter. K may be 2, 4, or 8.

Figure 6B:
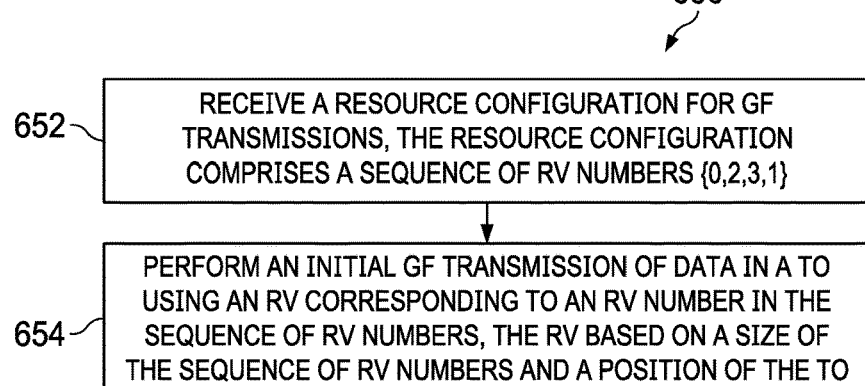
FIG. 6B shows a flowchart of a method for initial grant-free transmission determination, according to embodiments.

FIG. 6B illustrates a flowchart of a method 650 for initial grant-free transmission determination, according to some embodiments. The method 650 may be carried out or performed by a UE, such as the ED no in FIG. 1. The method 650 may also be carried out or performed by routines, subroutines, or modules of software executed by one or more processors of the UE. Coding of the software for carrying out or performing the method 650 is well within the scope of a person of ordinary skill in the art having regard to the present disclosure. The method may include additional or fewer operations than those shown and described and may be carried out or performed in a different order. Computer-readable code or instructions of the software executable by the one or more processor of the UE may be stored on a non-transitory computer-readable medium, such as for example, memory of the UE.

The method 650 starts at the operation 652, where the UE receives a resource configuration for grant-free (GF) transmissions. The resource configuration comprises a periodicity parameter (P), a repetition number (K), and a sequence of redundancy version (RV) numbers comprising {0, 2, 3, 1}. Here, o in the sequence corresponding to RV0, 1 in the sequence corresponding to RV1, 2 in the sequence corresponding to RV2, and 3 in the sequence corresponding to RV3. The periodicity parameter defines a period having K transmission occasions (TOs), and each of the K TOs is associated with one RV number in the sequence of RV numbers.

In some embodiments, K is an integer less than 4. The TO is an n-th TO of the K TOs associated with an (n mod 4)-th RV number in the sequence of RV numbers corresponding to the RV used for the GF transmission of the data in the TO. n is an integer greater than or equal to 0, and n is less than or equal to K−1. The K TOs may be continuous or separated.

At the operation 654, the UE performs an initial GF transmission of data in a TO of the K TOs in the period defined by the periodicity parameter using an RV corresponding to an RV number in the sequence of RV numbers. The RV is based on a size of the sequence of RV numbers and a position of the TO in the K TOs.

In some embodiments, the UE performs one or more new initial GF transmissions of the data for at most K GF transmissions of the data. Or, the UE terminates the one or more new initial GF transmissions of the data at a last TO of the K TOs within the period defined by the periodicity parameter.

Figure 7A:
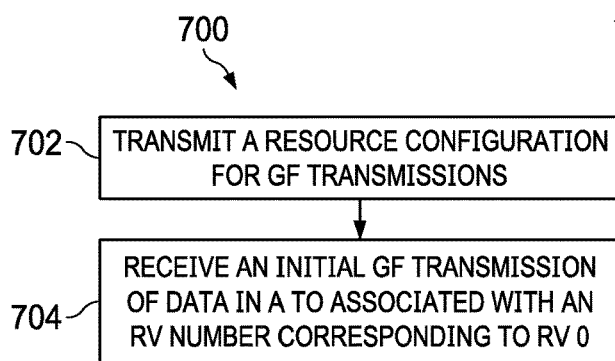
FIG. 7A shows a flowchart of a method for initial grant-free transmission determination, according to embodiments.

FIG. 7A illustrates a flowchart of a method 700 for initial grant-free transmission determination, according to some embodiments. The method 700 may be carried out or performed by a base station, such as the base station 170 in FIG. 1. The method 700 may also be carried out or performed by routines, subroutines, or modules of software executed by one or more processors of the base station. Coding of the software for carrying out or performing the method 700 is well within the scope of a person of ordinary skill in the art having regard to the present disclosure. The method may include additional or fewer operations than those shown and described and may be carried out or performed in a different order. Computer-readable code or instructions of the software executable by the one or more processor of the base station may be stored on a non-transitory computer-readable medium, such as for example, memory of the base station.

The method 700 begins at the operation 702, where the base station transmits a resource configuration for grant-free (GF) transmissions. The resource configuration comprises a periodicity parameter (P), a repetition number (K), and a sequence of redundancy version (RV) numbers corresponding to one or more RV types. The periodicity parameter defines a period having K transmission occasions (TOs), and each of the K TOs is associated with one RV number in the sequence of RV numbers.

In some embodiments, the sequence of RV numbers comprising {0, 3, 0, 3}. Here, 0 in the sequence corresponds to RV0, and 3 in the sequence corresponds to RV3. The K TOs are continuous or separated.

In some embodiments, a size of the sequence of RV numbers is 4. An n-th TO of the K TOs is associated with an (n mod 4)-th RV number in the sequence of RV numbers. Here, n is an integer greater than or equal to 0, and n is less than or equal to K−1.

At the operation 704, the base station receives an initial GF transmission of data in a TO of the K TOs in the period defined by the periodicity parameter. The TO is associated with an RV number corresponding to RV0.

In some embodiments, the base station receives one or more new initial GF transmissions of the data for at most K GF transmissions of the data. Or, the one or more new initial GF transmissions of the data may be terminated at a last TO of the K TOs within the period defined by the periodicity parameter. K may be 2, 4, or 8.

Figure 7B:
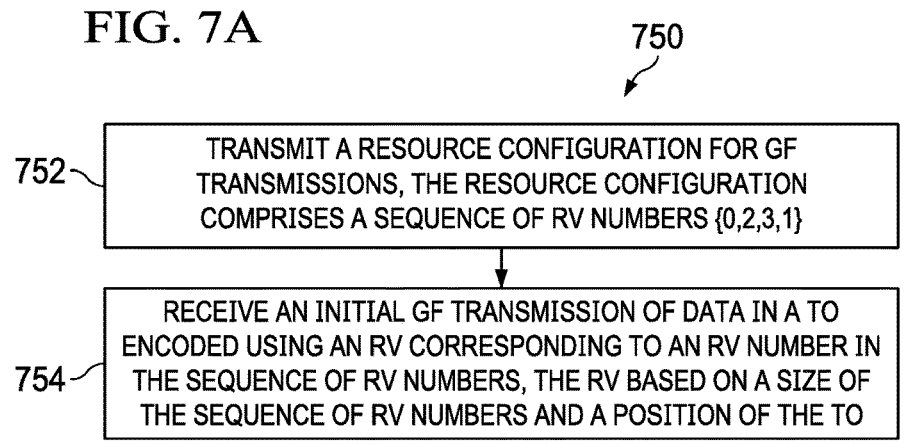
FIG. 7B shows a flowchart of a method for initial grant-free transmission determination, according to embodiments.

FIG. 7B illustrates a flowchart of a method 750 for initial grant-free transmission determination, according to some embodiments. The method 750 may be carried out or performed by a base station, such as the base station 170 in FIG. 1. The method 750 may also be carried out or performed by routines, subroutines, or modules of software executed by one or more processors of the base station. Coding of the software for carrying out or performing the method 750 is well within the scope of a person of ordinary skill in the art having regard to the present disclosure. The method may include additional or fewer operations than those shown and described and may be carried out or performed in a different order. Computer-readable code or instructions of the software executable by the one or more processor of the base station may be stored on a non-transitory computer-readable medium, such as for example, memory of the base station.

The method 750 starts at the operation 752, where the base station transmits a resource configuration for grant-free (GF) transmissions. The resource configuration comprises a periodicity parameter (P), a repetition number (K), and a sequence of redundancy version (RV) number's comprising {0, 2, 3, 1}. Here, 0 in the sequence corresponding to RV0, 1 in the sequence corresponding to RV1, 2 in the sequence corresponding to RV2, and 3 in the sequence corresponding to RV3. The periodicity parameter defines a period having K transmission occasions (TOs), and each of the K TOs is associated with one RV number in the sequence of RV numbers.

In some embodiments, K is an integer less than 4. The TO is an n-th TO of the K TOs associated with an (n mod 4)-th RV number in the sequence of RV numbers corresponding to the RV used for the GF transmission of the data in the TO. n is an integer greater than or equal to 0, and n is less than or equal to K−1. The K TOs may be continuous or separated.

At the operation 754, the base station receives an initial GF transmission of data in a TO of the K TOs in the period defined by the periodicity parameter using an RV corresponding to an RV number in the sequence of RV numbers. The RV is based on a size of the sequence of RV numbers and a position of the TO in the K TOs.

In some embodiments, the base station receives one or more new initial GF transmissions of the data for at most K GF transmissions of the data. Or, the one or more new initial GF transmissions of the data may be terminated at a last TO of the K TOs within the period defined by the periodicity parameter.

Figure 8:
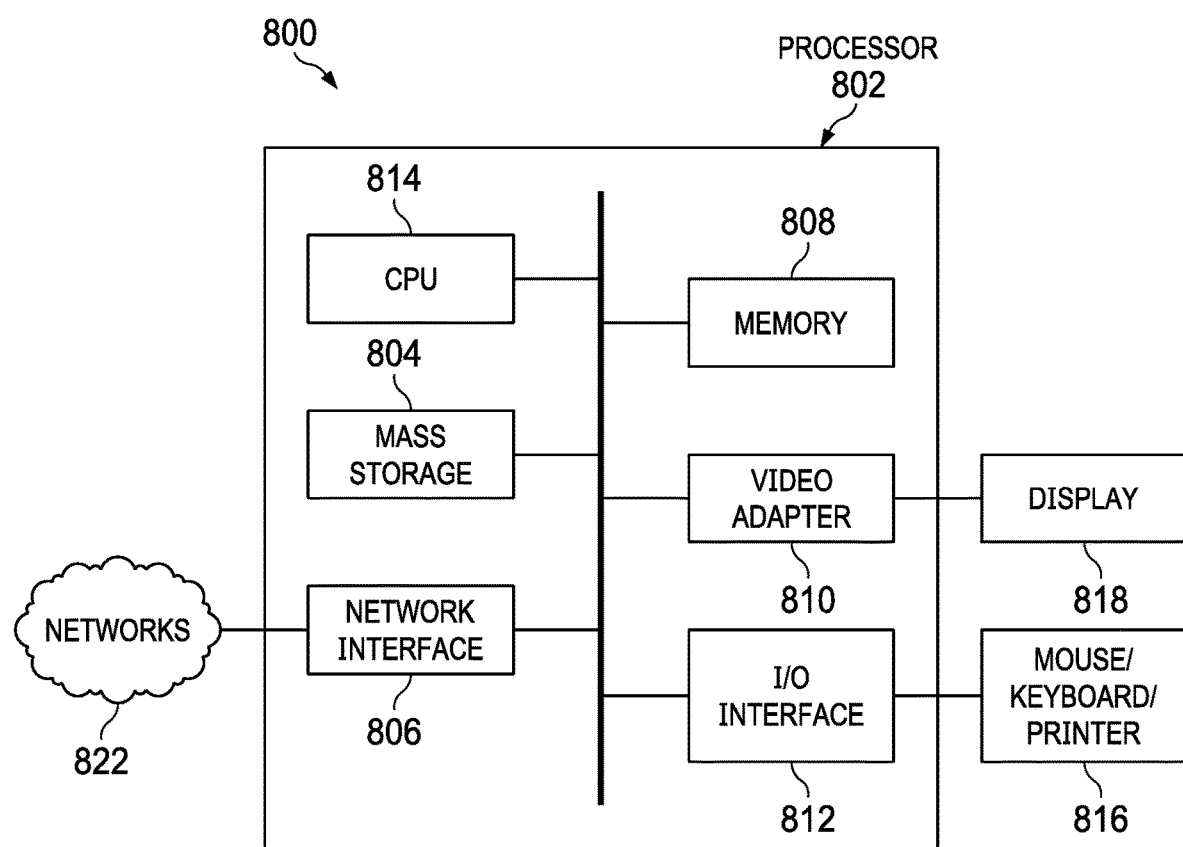
FIG. 8 shows an example of a computing system.

FIG. 8 is a block diagram of a computing system 800 that may be used for implementing the devices and methods disclosed herein. For example, the computing system can be any entity of UE, AN, MM, SM, UPGW, AS, BS, eNodeB, TRP (transmit-receive point), etc. Specific devices may utilize all of the components shown or only a subset of the components, and levels of integration may vary from device to device. Furthermore, a device may contain multiple instances of a component, such as multiple processors, memories, transmitters, receivers, etc. Such device can be can be any entity of LTE, AN, MM, SM, UPGW, AS, BS, eNodeB, TRP (transmit-receive point), etc. The computing system 800 includes a processor 802. The processor includes a central processor (CPU) 814, memory 808, and may further include a mass storage device 804, a video adapter 810, and an I/O interface 812 connected to a bus 820.

The bus 820 may be one or more of any type of several bus architectures including a memory bus or memory controller, a peripheral bus, or a video bus. The CPU 814 may comprise any type of electronic data processor. The memory 808 may comprise any type of non-transitory system memory such as static random access memory (SRAM), dynamic random access memory (DRAM), synchronous DRAM (SDRAM), read-only memory (ROM), or a combination thereof. In an embodiment, the memory 808 may include ROM for use at boot-up, and DRAM for program and data storage for use while executing programs.

The mass storage 804 may comprise any type of non-transitory storage device configured to store data, programs, and other information and to make the data, programs, and other information accessible via the bus 820. The mass storage 804 may comprise, for example, one or more of a solid state drive, hard disk drive, a magnetic disk drive, or an optical disk drive.

The video adapter 810 and the I/O interface 812 provide interfaces to couple external input and output devices to the processor 802. As illustrated, examples of input and output devices include a display 818 coupled to the video adapter 810 and a mouse/keyboard/printer 816 coupled to the I/O interface 812. Other devices may be coupled to the processor 802, and additional or fewer interface cards may be utilized. For example, a serial interface such as Universal Serial Bus (USB) (not shown) may be used to provide an interface for an external device.

The processor 802 also includes one or more network interfaces 806, which may comprise wired links, such as an Ethernet cable, and/or wireless links to access nodes or different networks. The network interfaces 806 allow the processor 802 to communicate with remote units via the networks. For example, the network interfaces 806 may provide wireless communication via one or more transmitters/transmit antennas and one or more receivers/receive antennas. In an embodiment, the processor 802 is coupled to a local-area network 822 or a wide-area network for data processing and communications with remote devices, such as other processors, the Internet, or remote storage facilities.

Please note that bus 820 and/or memory 808 may not exist when the processor are implemented by hardware, such as using integrated circuits or logic circuits.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processor or a processing module. Other steps may be performed by an establishing unit/module for establishing a serving cluster, an instantiating unit/module, an establishing unit/module for establishing a session link, a maintaining unit/module, or other performing units/modules for performing the above steps. The respective units/modules may be hardware, software, or a combination thereof. For instance, one or more of the units/modules may be an integrated circuit, such as field programmable gate arrays (FPGAs) or application-specific integrated circuits (ASICs).

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 maybe any component or collection of components adapted to store programming and/or instructions for execution by the processor 904. In an embodiment, the memory 906 includes a non-transitory computer readable medium. The interfaces 910, 912, 914 maybe any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personalcomputer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station (STA), a user equipment (UE), a personal computer (PC), a tablet, a wearable communications device (e.g., a smartwatch, etc.), or any other device adapted to access a telecommunications network.

In some embodiments, one or more of the interfaces 910, 912, 914 connects the processing system 900 to a transceiver adapted to transmit and receive signaling over' the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device- side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal.

The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module for establishing a serving cluster, an instantiating unit/module, an establishing unit/module for establishing a session link, a maintaining unit/module, or other performing units/modules for performing the above steps. The respective units/modules may be hardware, software, or a combination thereof. For instance, one or more of the units/modules may be a chip or an integrated circuit, such as field programmable gate arrays (FPGAs) or application-specific integrated circuits (ASICs). Also, computer-readable code or instructions of the software executable by the one or more processors may be stored on a non-transitory computer-readable medium, such as for example, memory of the UE or the base station.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, the method comprising:
receiving, by an apparatus, a resource configuration message for grant-free (GF) transmissions, wherein the resource configuration message indicates a periodicity parameter (P), a repetition number (K), and a sequence of redundancy version (RV) numbers corresponding to one or more RV types, the periodicity parameter defines a period having K transmission occasions (TOs), and each of the K TOs is associated with one RV number in the sequence of RV numbers; and
performing, by the apparatus, an initial GF transmission of data in a TO of the K TOs in the period defined by the periodicity parameter, wherein the TO is associated with an RV number in the sequence of RV numbers, and wherein the TO associated with the RV number is determined based on whether arrival of the data at the apparatus misses a first TO of the K TOs and based on whether the RV number corresponds to RV0.

2. The method of claim 1, the sequence of RV numbers comprising {0, 3, 0, 3}, 0 in the sequence corresponding to RV0, and 3 in the sequence corresponding to RV3.

3. The method of claim 1, wherein the K TOs are continuous or separated.

4. The method of claim 1, wherein the apparatus performs one or more new initial GF transmissions of the data for at most K GF transmissions of the data, or terminates the one or more new initial GF transmissions of the data at a last TO of the K TOs within the period defined by the periodicity parameter.

5. The method of claim 1, wherein K is 2, 4, or 8.

6. The method of claim 1, wherein a size of the sequence of RV numbers is 4, an n-th TO of the K TOs is associated with an (n mod 4)-th RV number in the sequence of RV numbers, n is an integer greater than or equal to 0, and n is less than or equal to K−1.

7. A method, the method comprising:
receiving, by an apparatus, a resource configuration message for grant-free (GF) transmissions, wherein the resource configuration message indicates a periodicity parameter (P), a repetition number (K), and a sequence of redundancy version (RV) numbers comprising {0, 2, 3, 1}, 0 in the sequence corresponding to RV0, 1 in the sequence corresponding to RV1, 2 in the sequence corresponding to RV2, and 3 in the sequence corresponding to RV3, the periodicity parameter defines a period having K transmission occasions (TOs), and each of the K TOs is associated with one RV number in the sequence of RV numbers; and
performing, by the apparatus, an initial GF transmission of data in a TO of the K TOs in the period defined by the periodicity parameter using an RV corresponding to an RV number in the sequence of RV numbers, the RV based on a size of the sequence of RV numbers and a position of the TO in the K TOs, wherein the TO is determined based on whether arrival of the data at the apparatus misses a first TO of the K TOs and based on whether the RV number corresponds to RV0.

8. The method of claim 7, wherein K is an integer less than 4, the TO is an n-th TO of the K TOs associated with an (n mod 4)-th RV number in the sequence of RV numbers corresponding to the RV used for the GF transmission of the data in the TO, n is an integer greater than or equal to 0, and n is less than or equal to K−1.

9. The method of claim 7, wherein the K TOs are continuous or separated.

10. The method of claim 7, wherein the apparatus performs one or more new initial GF transmissions of the data for at most K GF transmissions of the data, or terminates the one or more new initial GF transmissions of the data at a last TO of the K TOs within the period defined by the periodicity parameter.

11. The method of claim 7, wherein K is 2 or 4.

12. An apparatus, the apparatus comprising:
a processor; and
a non-transitory computer readable storage medium storing programming for execution by the processor, the programming including instructions to:
receive a resource configuration message for grant-free (GF) transmissions, wherein the resource configuration message indicates a periodicity parameter (P), a repetition number (K), and a sequence of redundancy version (RV) numbers corresponding to one or more RV types, the periodicity parameter defines a period having K transmission occasions (TOs), and each of the K TOs is associated with one RV number in the sequence of RV numbers; and
perform an initial GF transmission of data in a TO of the K TOs in the period defined by the periodicity parameter, wherein the TO is associated with an RV number in the sequence of RV numbers, and wherein the TO associated with the RV number is determined based on whether arrival of the data at the apparatus misses a first TO of the K TOs and based on whether the RV number corresponds to RV0.

13. The apparatus of claim 12, the sequence of RV numbers comprising {0, 3, 0, 3}, 0 in the sequence corresponding to RV0, and 3 in the sequence corresponding to RV3.

14. The apparatus of claim 12, wherein the K TOs are continuous or separated.

15. The apparatus of claim 12, wherein the apparatus performs one or more new initial GF transmissions of the data for at most K GF transmissions of the data, or terminates the one or more new initial GF transmissions of the data at a last TO of the K TOs within the period defined by the periodicity parameter.

16. The apparatus of claim 12, wherein K is 2, 4, or 8.

17. The apparatus of claim 12, wherein a size of the sequence of RV numbers is 4, an n-th TO of the K TOs is associated with an (n mod 4)-th RV number in the sequence of RV numbers, n is an integer greater than or equal to 0, and n is less than or equal to K−1.

18. An apparatus, the apparatus comprising:
a processor; and
a non-transitory computer readable storage medium storing programming for execution by the processor, the programming including instructions to:
receive a resource configuration message for grant-free (GF) transmissions, wherein the resource configuration message indicates a periodicity parameter (P), a repetition number (K), and a sequence of redundancy version (RV) numbers comprising {0, 2, 3, 1}, 0 in the sequence corresponding to RV0, 1 in the sequence corresponding to RV1, 2 in the sequence corresponding to RV2, and 3 in the sequence corresponding to RV3, the periodicity parameter defines a period having K transmission occasions (TOs), and each of the K TOs is associated with one RV number in the sequence of RV numbers; and
perform an initial GF transmission of data in a TO of the K TOs in the period defined by the periodicity parameter using an RV corresponding to an RV number in the sequence of RV numbers, the RV based on a size of the sequence of RV numbers and a position of the TO in the K TOs, wherein the TO is determined based on whether arrival of the data at the apparatus misses a first TO of the K TOs and based on whether the RV number corresponds to RV0.

19. The apparatus of claim 18, wherein K is an integer less than 4, the TO is an n-th TO of the K TOs associated with an (n mod 4)-th RV number in the sequence of RV numbers corresponding to the RV used for the GF transmission of the data in the TO, n is an integer greater than or equal to 0, and n is less than or equal to K−1.

20. The apparatus of claim 18, wherein the K TOs are continuous or separated.

21. The apparatus of claim 18, wherein the apparatus performs one or more new initial GF transmissions of the data for at most K GF transmissions of the data, or terminates the one or more new initial GF transmissions of the data at a last TO of the K TOs within the period defined by the periodicity parameter.

22. The apparatus of claim 18, wherein K is 2 or 4.

* * * * *